(12) United States Patent
Tsuzuki

(10) Patent No.: US 9,774,759 B2
(45) Date of Patent: Sep. 26, 2017

(54) PRINT CONTROL APPARATUS, PRINT CONTROL METHOD, AND STORAGE MEDIUM

(71) Applicant: CANON KABUSHIKI KAISHA, Tokyo (JP)

(72) Inventor: Takashi Tsuzuki, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/010,574

(22) Filed: Jan. 29, 2016

(65) Prior Publication Data
US 2016/0234401 A1   Aug. 11, 2016

(30) Foreign Application Priority Data

Feb. 10, 2015   (JP) ................................. 2015-024695

(51) Int. Cl.
*H04N 1/44* (2006.01)
*H04N 1/00* (2006.01)

(52) U.S. Cl.
CPC ....... *H04N 1/4413* (2013.01); *H04N 1/00204* (2013.01); *H04N 1/444* (2013.01); *H04N 2201/006* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 2013/0329253 A1* | 12/2013 | Sasaki | ................. | H04N 1/0035 358/1.15 |
| 2014/0146361 A1* | 5/2014 | Nakane | ................. | G06F 3/1207 358/1.15 |
| 2015/0003691 A1* | 1/2015 | Joo | .................... | G06K 9/00604 382/117 |
| 2016/0127592 A1* | 5/2016 | Nakamura | ......... | H04N 1/00923 358/1.13 |
| 2016/0134773 A1* | 5/2016 | Nagasawa | .......... | H04N 1/00896 358/1.13 |
| 2016/0165397 A1* | 6/2016 | Yang | .................... | H04W 64/00 455/456.5 |

FOREIGN PATENT DOCUMENTS

| | | | |
|---|---|---|---|
| JP | 2008037077 A | * | 2/2008 |
| JP | 2010-211531 A | | 9/2010 |

* cited by examiner

*Primary Examiner* — Fan Zhang
(74) *Attorney, Agent, or Firm* — Fitzpatrick, Cella, Harper & Scinto

(57) ABSTRACT

If another person comes close to a printing apparatus or print control apparatus during output of a print job by authenticated printing, he/she may accidentally glance at an output material, and private information or confidential information to be hidden may leak. To solve this problem, a print control apparatus according to an embodiment of this invention executes the following control processing. That is, if a received print job is an authenticated print job requiring authentication processing and there is a person nearby the print control apparatus other than the executor of the authenticated print job, a selection screen for accepting execution or holding of printing is displayed. In accordance with an instruction input to the selection screen, printing of the authenticated print job by the printing unit is controlled.

20 Claims, 11 Drawing Sheets

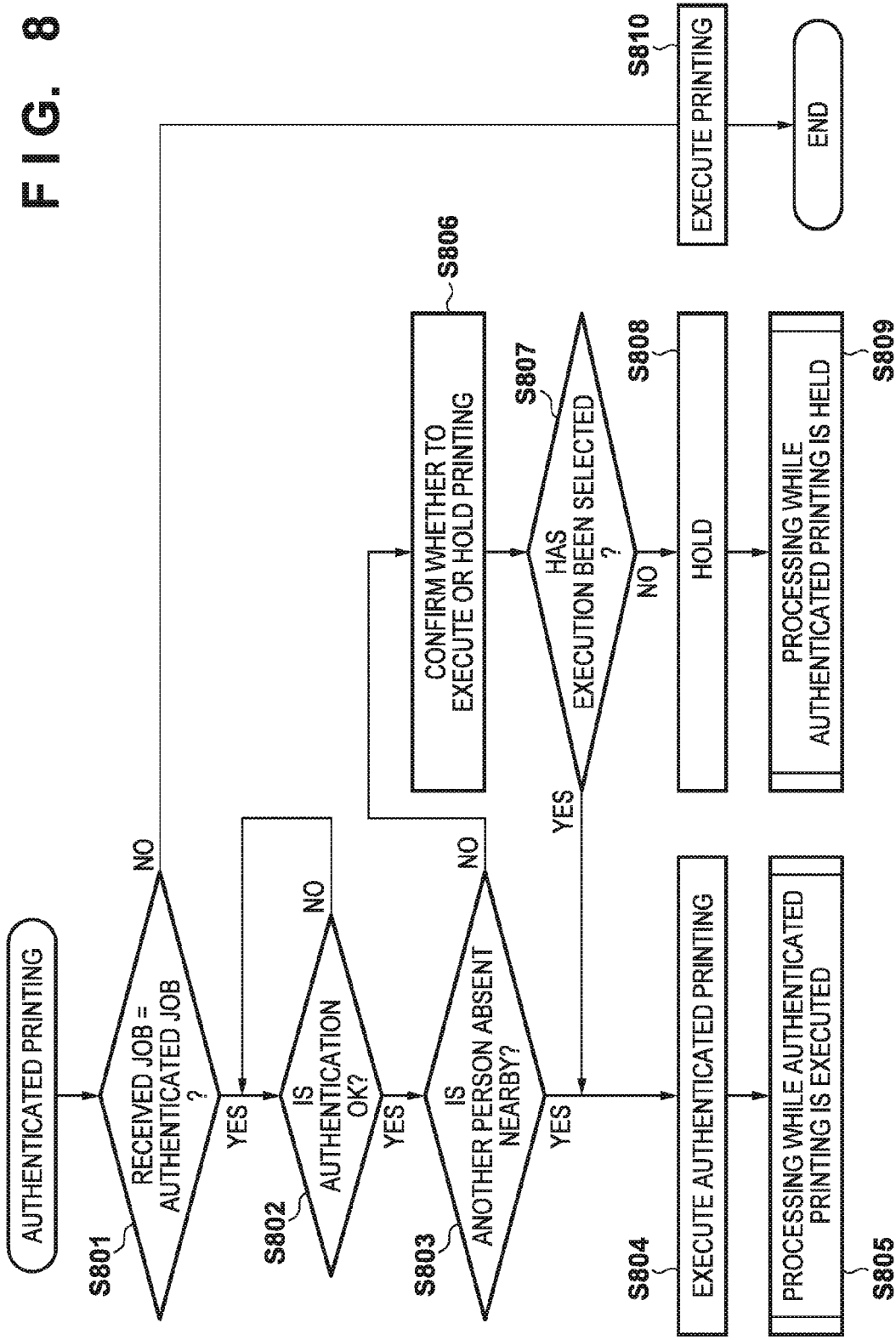

PRINT CONTROL APPARATUS, PRINT CONTROL METHOD, AND STORAGE MEDIUM

BACKGROUND OF THE INVENTION

Field of the Invention

The present invention relates to a print control apparatus, a print control method, and a storage medium, and particularly to, for example, a print control apparatus for printing an image on a print medium by accepting a print job using short distance wireless communication of Bluetooth®, a print control method, and a storage medium.

Description of the Related Art

In recent years, a short distance wireless communication technique is coming into practical use. This technique is used to, for example, add a point to the IC card of a customer, activate a coupon application, or perform settlement when he/she comes into a store, or detect a position indoors by using Bluetooth Low Energy (BLE).

On the other hand, some printing apparatuses such as a single function printer and multifunction printer perform user authentication by inputting a password or using an IC card to execute printing in order to prevent private information or confidential information from leaking by an output paper document. For example, Japanese Patent Laid-Open No. 2010-211531 proposes a printing apparatus for performing user authentication using biological information to start a printout.

However, the conventional example has the following problem.

If another person comes close to a printing apparatus or print control apparatus during output of a print job by authenticated printing, he/she may undesirably glance at an output material, and confidential information such as private information for which the user originally wants to maintain the confidentiality may leak.

SUMMARY OF THE INVENTION

Accordingly, the present invention is conceived as a response to the above-described disadvantages of the conventional art.

For example, a print control apparatus, a print control method, and a storage medium according to this invention are capable of further enhancing prevention of leakage to a third party when executing authenticated printing using a short distance wireless communication technique.

According to one aspect of the present invention, there is provided a print control apparatus for controlling a print unit configured to print an image on a print medium based on a print job, comprising: a reception unit configured to receive the print job; a hold unit configured to, in a case where the print job received by the reception unit is an authenticated print job requiring authentication processing and there are a plurality of persons nearby the print unit, hold print processing based on the authenticated print job; and a control unit configured to, in a case where it is determined that a situation nearby the print unit changed from a state where there are a plurality of persons to a state where there is a single person, restart the print processing held by the hold unit.

According to another aspect of the present invention, there is provided a print control method in a print control apparatus for controlling a print unit configured to print an image on a print medium based on a print job, comprising: receiving the print job; in a case where the received print job is an authenticated print job requiring authentication processing and there are a plurality of persons nearby the print unit, holding print processing based on the authenticated print job; and in a case where it is determined that a situation nearby the print unit changed from a state where there are a plurality of persons to a state where there is a single person, restarting the held print processing.

According to still another aspect of the present invention, there is provided a non-transitory computer readable storage medium which stores a computer program to be executed in a processor of a print control apparatus for controlling a print unit configured to print an image on a print medium based on a print job, the program causing the print control apparatus to perform the steps recited in the above method.

The invention is particularly advantageous since it is controlled to hold/continue a printing operation in accordance with a situation nearby a print control apparatus in authenticated printing, and it is thus possible to prevent private information or confidential information from leaking due to an output document.

Further features of the present invention will become apparent from the following description of exemplary embodiments (with reference to the attached drawings).

BRIEF DESCRIPTION OF THE DRAWINGS

FIG. 8 is a flowchart illustrating print control processing of an authenticated print job executed by the MFP.

DESCRIPTION OF THE EMBODIMENTS

Figure 1:
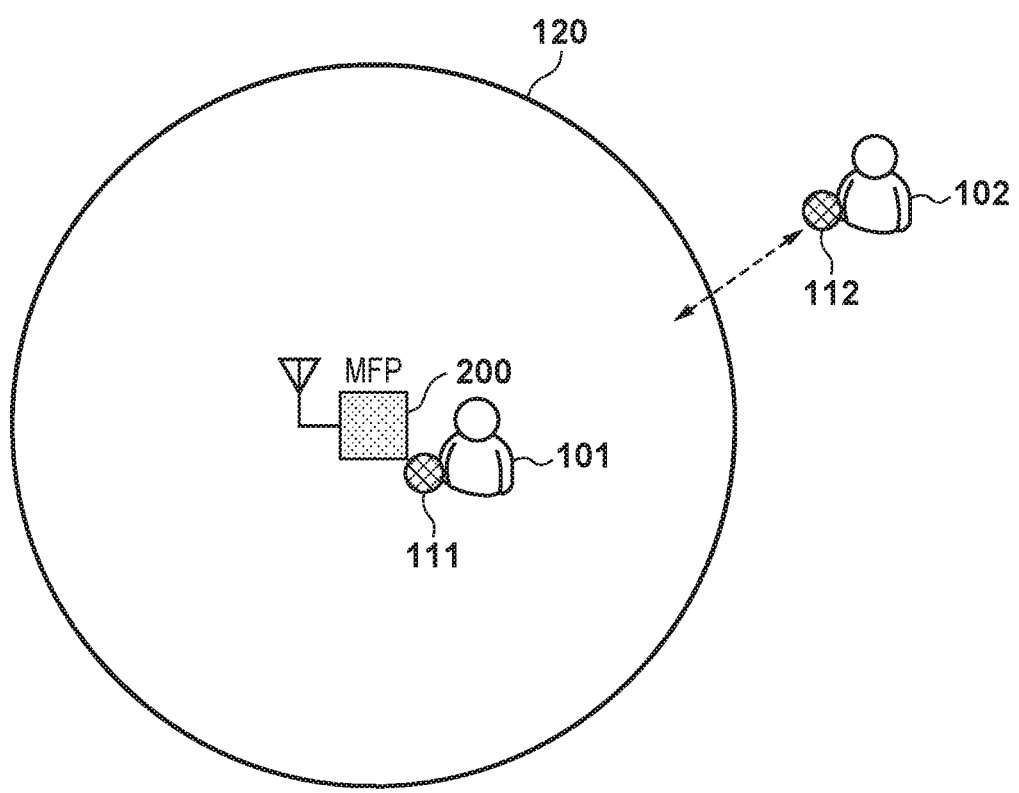
FIG. 1 is a view showing an MFP as an exemplary embodiment of the present invention and its peripheral environment.

Exemplary embodiments of the present invention will now be described in detail in accordance with the accompanying drawings. Note that the same reference numerals denote already explained parts, and a repetitive description thereof will be omitted. Note that the relative arrangement of components, a display screen, and the like set forth in the embodiments do not limit the scope of the present invention unless otherwise specified.

In this specification, the terms "print" and "printing" not only include the formation of significant information such as characters and graphics, but also broadly includes the formation of images, figures, patterns, and the like on a print medium, or the processing of the medium, regardless of whether they are significant or insignificant and whether they are so visualized as to be visually perceivable by humans.

Also, the term "print medium" not only includes a paper sheet used in common printing apparatuses, but also broadly includes materials, such as cloth, a plastic film, a metal plate, glass, ceramics, wood, and leather, capable of accepting ink.

Furthermore, the term "ink" (to be also referred to as a "liquid" hereinafter) should be extensively interpreted similar to the definition of "print" described above. That is, "ink" includes a liquid which, when applied onto a print medium, can form images, figures, patterns, and the like, can process the print medium, and can process ink. The process of ink includes, for example, solidifying or insolubilizing a coloring agent contained in ink applied to the print medium.

Further, a "nozzle (printing element)" generically means an ink orifice or a liquid channel communicating with it, and an element for generating energy used to discharge ink, unless otherwise specified.

In an embodiment to be described below, an example of print control when a person other than an authenticated print job executor moves close to a print control apparatus which currently executes authenticated printing while the authenticated print job executor executes authenticated printing will be explained. In the embodiment to be described below, the print control apparatus will be explained by exemplifying a multifunction printer (MFP) for implementing a scanner function, copy function, printing function, and the like. However, the present invention is also applicable to an MFP further having a facsimile function, a single function printer having only a printing function, and the like. Furthermore, various printing methods such as an inkjet method and electrophotographic method can be employed for a printer engine for implementing a printing function. In the embodiment, a printer engine employing the inkjet method is used. An arrangement capable of executing not only monochrome printing but also color printing can be used for the printer engine.

In addition, an MFP to be described below can execute print control using a short distance wireless communication function of Bluetooth®.

FIG. 1 is a view showing an MFP as an exemplary embodiment of the present invention and its peripheral environment.

As shown in FIG. 1, there is an authenticated print job executor (job executor) 101 near an MFP 200 to execute authenticated printing. Authenticated printing is a printing method of outputting data after performing identity verification by a password, IC card authentication, or the like at the time of output, which is used when the user does not want another person to glance at a document such as private information or confidential information. On the other hand, another person 102 other than the authenticated print job executor freely moves close to or away from the MFP 200.

The MFP 200 has a reading function of reading an image of an original placed on an original table, and a printing function of printing an image on a print medium such as a printing sheet based on image data obtained by reading or that transferred from another apparatus. The MFP 200 can additionally have a facsimile function and telephone function as other functions. Each of the job executor 101 and the other person 102 holds a device (BLE wireless device) 111 or 112 capable of performing wireless communication by Bluetooth Low Energy (to be referred to as BLE hereinafter). BLE is a short distance wireless communication function of Bluetooth® 4.0 which can operate with low consumption power and has a communication range of up to about 50 m, and supports an advertising communication method of broadcasting certain information to the periphery of a device. Each of the BLE wireless devices 111 and 112 is desirably a device which can be incorporated in a staff identity card or a mobile terminal such as a smartphone, and is carried and used by the user.

Referring to FIG. 1, a person detection area 120 indicates an area where the MFP 200 determines the approach of the other person 102. When the other person 102 comes close to the MFP 200 across the border, the MFP 200 determines that there is the other person 102 nearby.

Figure 2A:
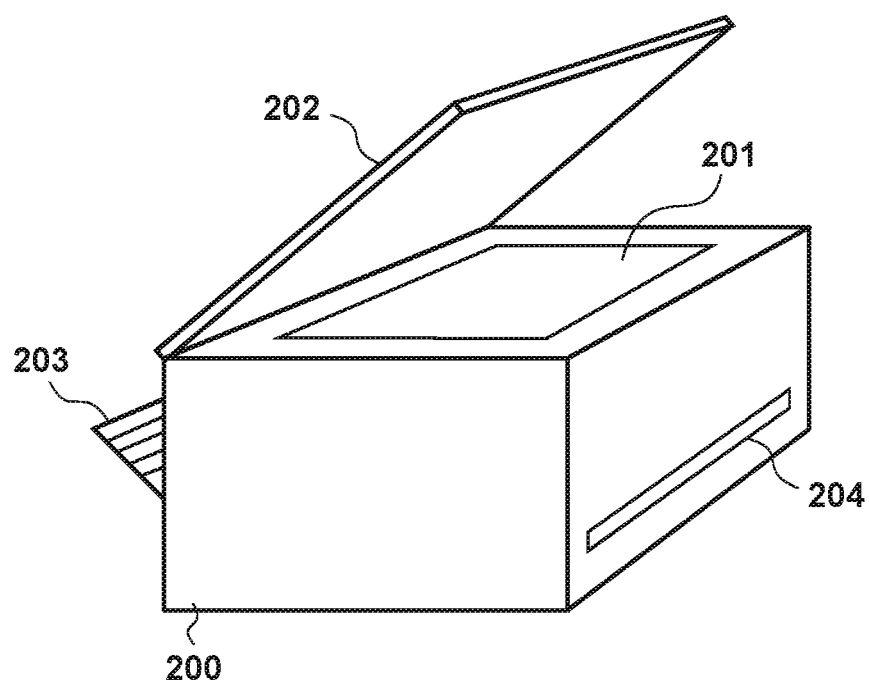
FIGS. 2A and 2B are a perspective view and plan view, respectively, showing the outer appearance of the MFP.
Figure 2B:
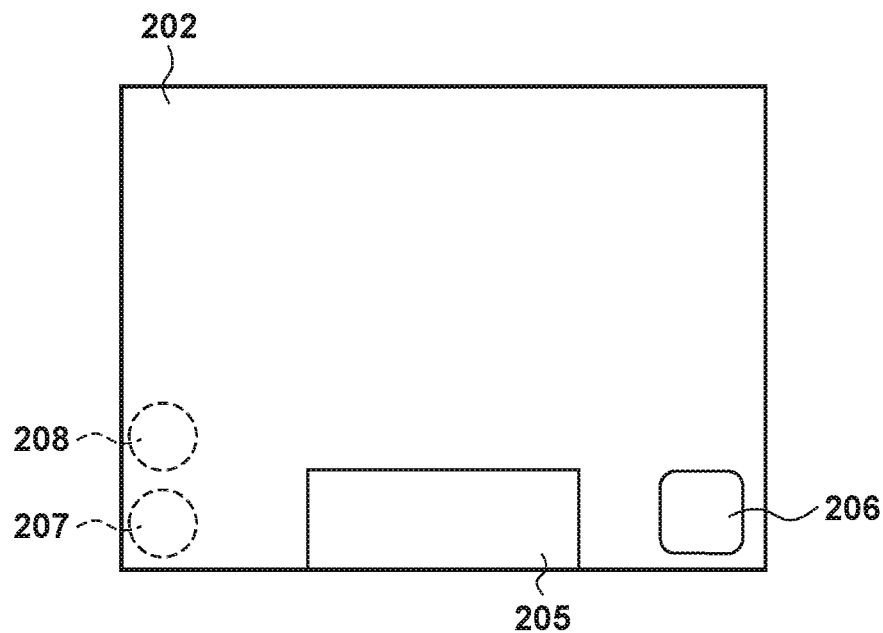

FIGS. 2A and 2B are views respectively showing the outer appearance of the MFP 200. FIG. 2A is a schematic perspective view showing the MFP 200 and FIG. 2B is a plan view showing the MFP 200.

As shown in FIG. 2A, an original table 201 is a glass-like transparent table and is used to place an original and read the image of the original by the scanner. An original cover 202 is used to prevent reading light from externally leaking at the time of reading by the scanner. A printing paper insert port 203 is used to set paper sheets of various sizes (for example, A4, B5, and the like). The paper sheets set in the printing paper insert port 203 are conveyed to a printing unit one by one, undergo desired printing, and are discharged from a printing paper discharge port 204.

As shown in FIG. 2B, an operation panel 205 and an NFC (Near Field Communication) unit 206 are arranged on the original cover 202. The operation panel 205 includes a display screen used to display images, an operation menu, and the like, a 4-way selector used to move a cursor on the display unit, and keys used to execute various functions. The operation panel 205 will be described later with reference to FIG. 3. The NFC unit 206 is a unit used to perform near field wireless communication, and is a place to which a communication partner apparatus is actually brought closer. An effective distance of contact is about 10 cm. Upon performing authentication using an IC card, the user can bring the IC card closer to the NFC unit 206 to transmit/receive authentication information. A WLAN antenna 207 is used to perform wireless LAN (to be referred to as WLAN hereinafter) communication, and a BT antenna 208 is used to perform Bluetooth® communication. Both the antennas are embedded in the original cover 202.

Figure 3:
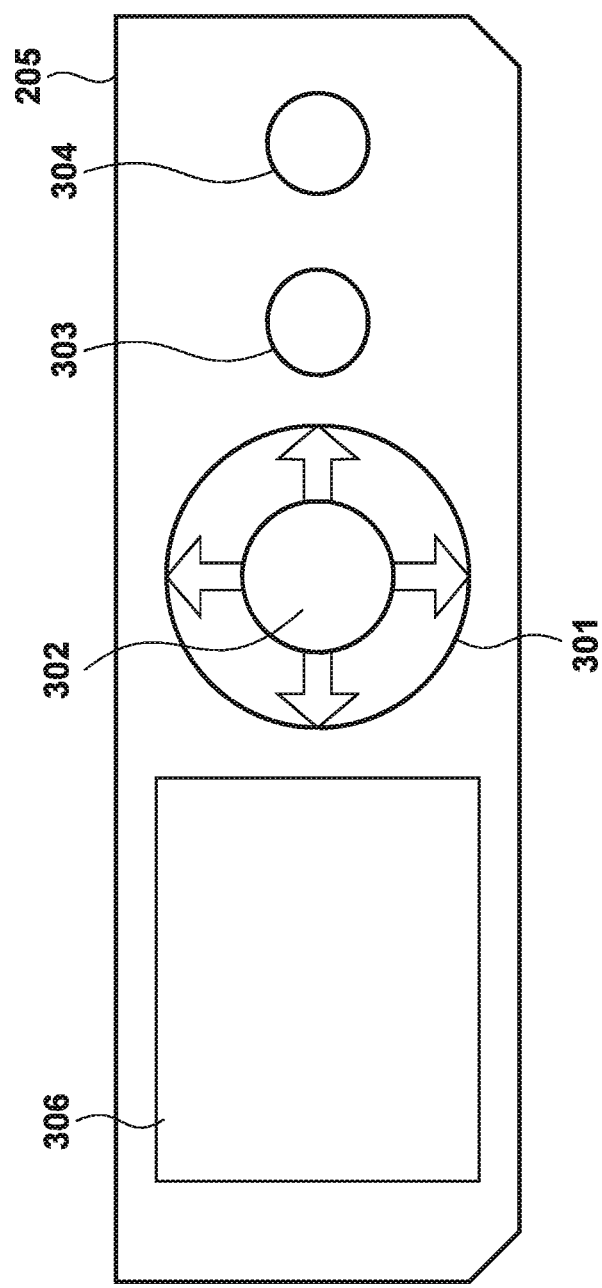
FIG. 3 is a plan view showing the arrangement layout of an operation panel.

FIG. 3 is a plan view showing the arrangement layout of the operation panel.

As shown in FIG. 3, a display unit 306 which includes, for example, a dot matrix LCD and displays images, an operation menu, and the like on a screen is provided on the left side of the operation panel 205. Furthermore, a 4-way selector 301 used to move a cursor on the display unit 306 and to input numbers and a set key 302 used to input settings are arranged at the center of the operation panel 205. A function key 303 used for a function setting operation and the like and a start key 304 used to issue a print start instruction and the like are arranged on the right side of the operation panel 205.

Figure 4:
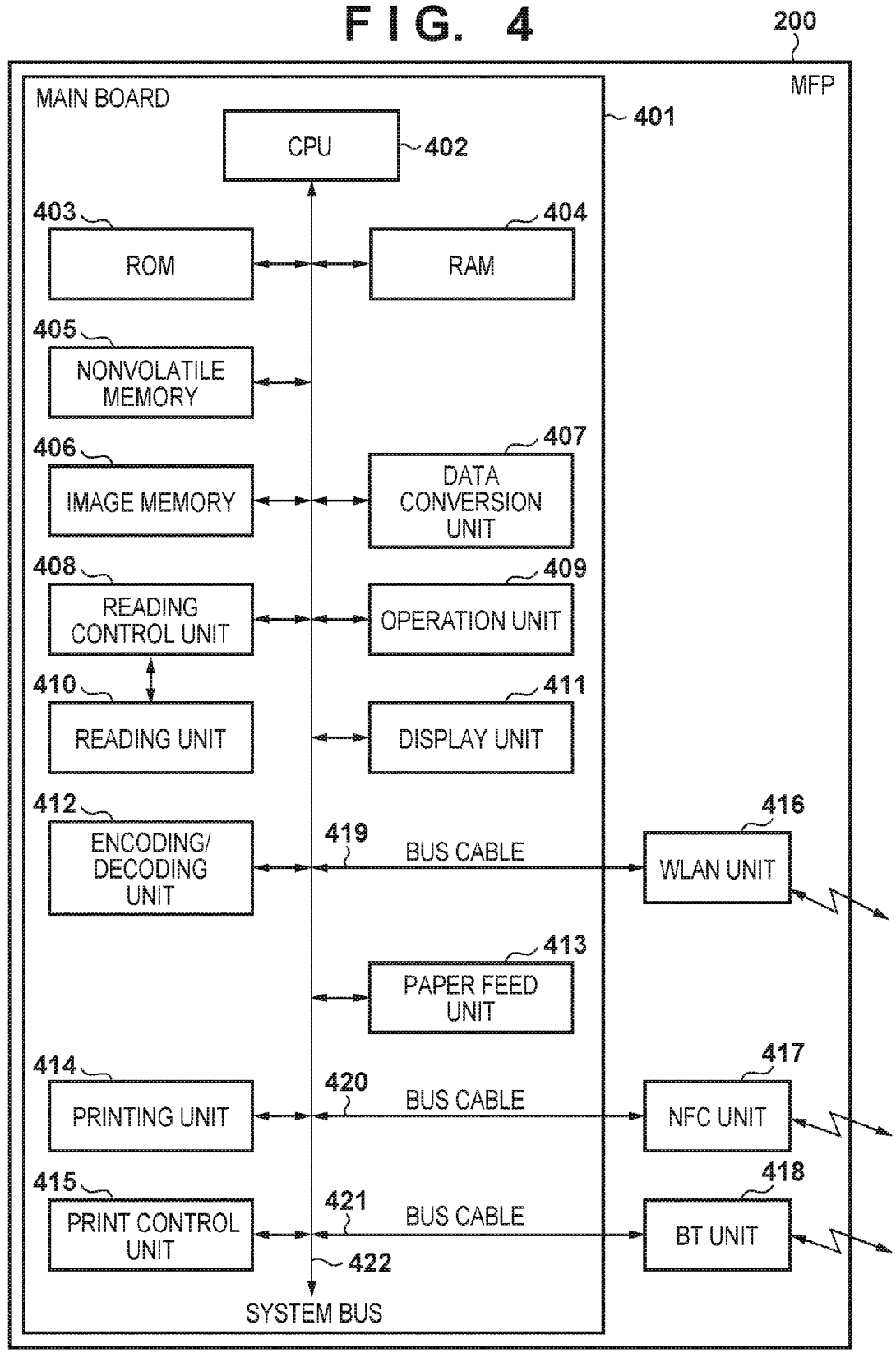
FIG. 4 is a block diagram showing the schematic control arrangement of the MFP.

FIG. 4 is a block diagram showing the schematic control arrangement of the MFP 200.

As shown in FIG. 4, the MFP 200 includes a main board 401 for executing main control of the apparatus, a WLAN unit 416 for performing WLAN communication, an NFC unit 417 for performing NFC communication, and a BT unit 418 for performing Bluetooth® communication.

The main board 401 includes a CPU 402 for controlling the overall MFP 200, and a ROM 403 storing control programs, an embedded operating system (OS), and the like to be executed by the CPU 402. In this embodiment, scheduling, task switching, or the like of each control program stored in the ROM 403 is controlled under the management of the embedded OS stored in the ROM 403 when the CPU 402 operates the OS.

A RAM 404 implemented by an SRAM or the like stores program control variables, setting values registered by the user, management data of the MFP 200, and the like, and is allocated with various work buffer areas. A nonvolatile memory 405 implemented by a flash memory or the like stores data to be held even after power-off. More specifically, the nonvolatile memory 405 stores phone numbers of facsimile transmission destinations, a communication history, user data such as network information, a list of apparatuses connected in the past, setting information of the MFP such as menu items including a print mode and correction information of an inkjet printhead, and the like. An image memory 406 implemented by a DRAM or the like stores image data received via each communication unit, image data processed by an encoding/decoding unit 412, and the like. Note that the present invention is not limited to the above-described memory structure, and memories of other types may be used.

A data conversion unit 407 executes analysis of a page description language (PDL) and the like, conversion from image data into print data, and the like.

A reading control unit 408 controls a series of reading operations of, for example, converting, into an image signal, an electrical signal obtained when a reading unit 410 including a CIS image sensor (contact type image sensor) optically reads an original. Control of an image processing unit (not shown) is executed so that the image processing unit (not shown) performs various kinds of image processing such as binarization processing and halftoning processing for image data based on the image signal and outputs high-resolution image data. An operation unit 409 and a display unit 411 represent the operation panel 205 described with reference to FIG. 3. The encoding/decoding unit 412 performs encoding/decoding processing and resizing processing for image data (JPEG, PNG, or the like) to be processed by the MFP 200.

A paper feed unit 413 includes a cassette for holding print media such as printing sheets to be used in printing, and feeds a printing medium from the cassette. The paper feed operation is controlled by a print control unit 415. Note that the paper feed unit 413 can include a plurality of cassettes to hold a plurality of types of print media in one apparatus. In this case, the print control unit 415 controls to select one of the plurality of cassettes to feed a printing sheet.

The print control unit 415 performs, via the image processing unit (not shown), various kinds of image processing such as smoothing processing, print density correction processing, and color correction for image data to be used in printing, converts the image data into high-resolution image data, and outputs the obtained image data to a printing unit 414. The print control unit 415 periodically reads out information of the printing unit 414, and updates information in the RAM 404. More specifically, the print control unit 415 updates pieces of information representing the ink residual amount of an ink tank, a printhead state, and the like.

The MFP 200 incorporates the above-described three units to implement wireless communication, and can perform wireless communication by WLAN, NFC, and Bluetooth®. The WLAN unit 416, the NFC unit 417, and the BT unit 418 serve as communication units for performing data communication with another wireless communication device such as a mobile terminal. Each of these units converts data into packets and transmits the packets to another wireless communication device. Each of these units also receives packets transmitted from another external wireless communication device, converts the packets into data, and transfers the data to the CPU 402. The WLAN unit 416, the NFC unit 417, and the BT unit 418 are connected by dedicated bus cables 419, 420, and 421, respectively. The WLAN unit 416, the NFC unit 417, and the BT unit 418 are units each used to implement communication conforming to its specification. The above-described components 403 to 418 are connected to each other via a system bus 422 managed by the CPU 402.

Figure 5:
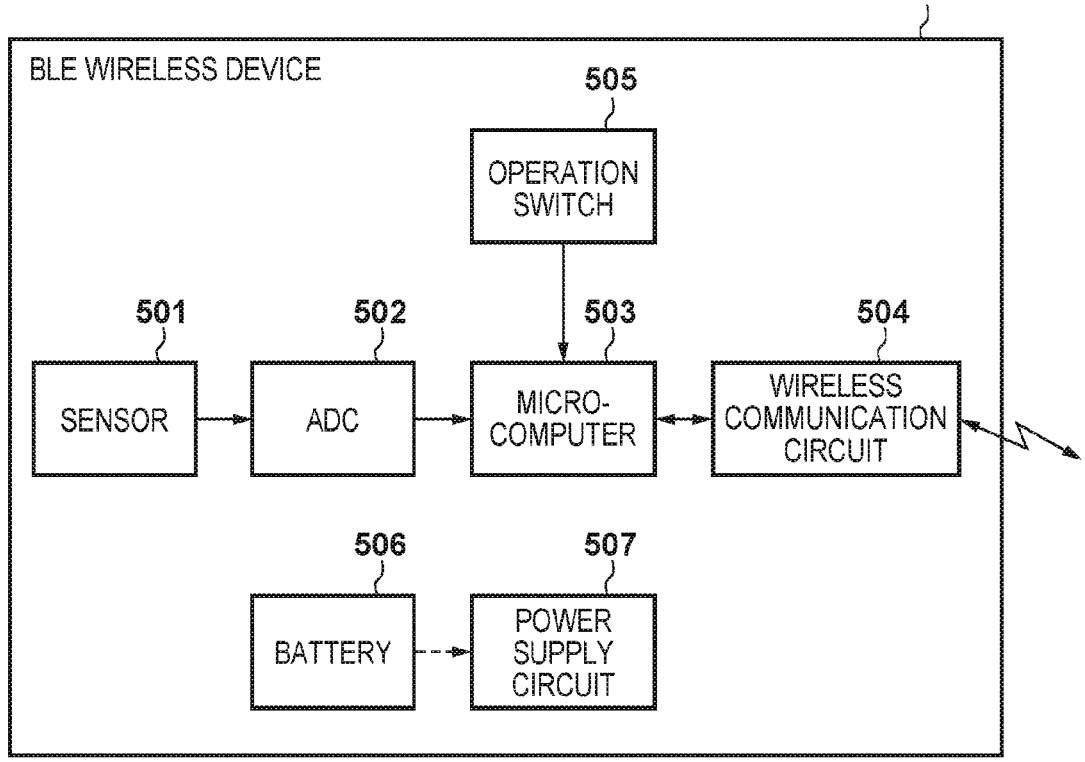
FIG. 5 is a block diagram showing the schematic arrangement of a BLE wireless device.

FIG. 5 is a block diagram showing the schematic arrangement of each of the BLE wireless devices 111 and 112.

Referring to FIG. 5, a sensor 501 is a device for converting a physical amount to be sensed into an electrical signal. For example, there are an intrusion monitoring sensor and motion sensor for crime prevention and security, and biological information sensors such as a sphygmograph, electrocardiograph, and clinical thermometer for medical care and nursing care. An ADC 502 is an analog-to-digital conversion circuit for converting an analog signal obtained from the sensor 501 into a digital signal processible by a microprocessor. A microcomputer 503 is a microprocessor for sampling data or performing wireless communication processing. This microcomputer incorporates a RAM and flash memory. A wireless communication circuit 504 includes a wireless communication chip, a crystal oscillator, an inductance, and a capacitor, and performs reception and transmission of wireless communication. An operation switch 505 is used to turn on or off the power in a device standby state. A battery 506 includes a primary battery and a secondary battery. A power supply circuit 507 is used to, for example, adjust a voltage to more efficiently supply power supplied from the battery 506.

Figure 6:
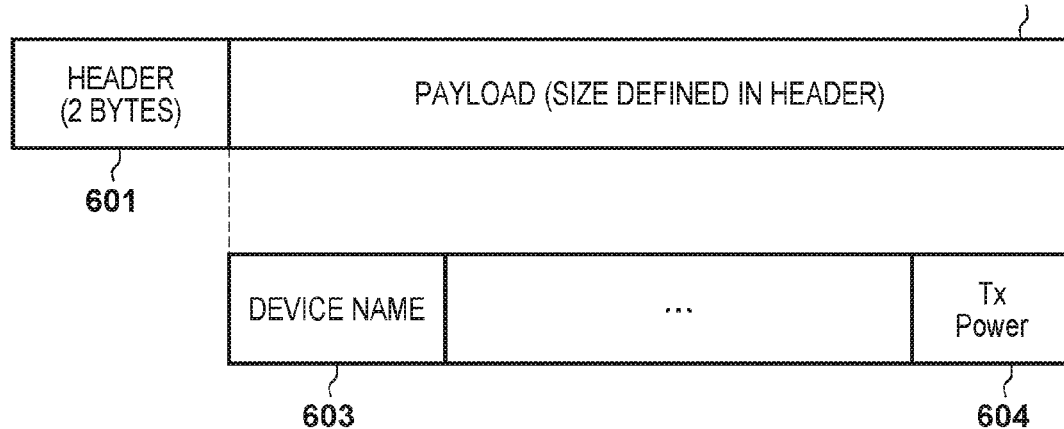
FIG. 6 is a view showing an example of an advertisement packet structure broadcast by the BLE wireless device to its periphery.

FIG. 6 is a view showing an example of an advertisement packet structure broadcast by the BLE wireless device 111 or 112 to its periphery.

When the BLE wireless device 111 or 112 is set in a power-on state, it performs initialization processing and is set in an advertising state. When the BLE wireless device 111 or 112 is set in the advertising state, it periodically transmits an advertisement packet at settable intervals, and notifies nearby devices of the existence of itself. The advertisement packet is formed from a 2-byte header 601 and a payload 602, as shown in FIG. 6. The header 601 is an area for storing the type of the packet, information about the size of the payload, and the like. The payload 602 can store a transmission power (Tx Power) 604 in addition to a device name 603 and mounted profile information.

The BT unit 418 of the MFP 200 receives the advertisement packet transmitted from the BLE wireless device 111 or 112. The MFP 200 obtains a propagation loss based on the value of the transmission power (Tx Power) 604 stored in the advertisement packet and the reception signal intensity of the received packet, and estimates the distance between the MFP and the BLE wireless device.

Some embodiments of print control in authenticated printing executed by the MFP and BLE wireless device which have the above-described arrangements will be described next.

First Embodiment

Figure 7A:
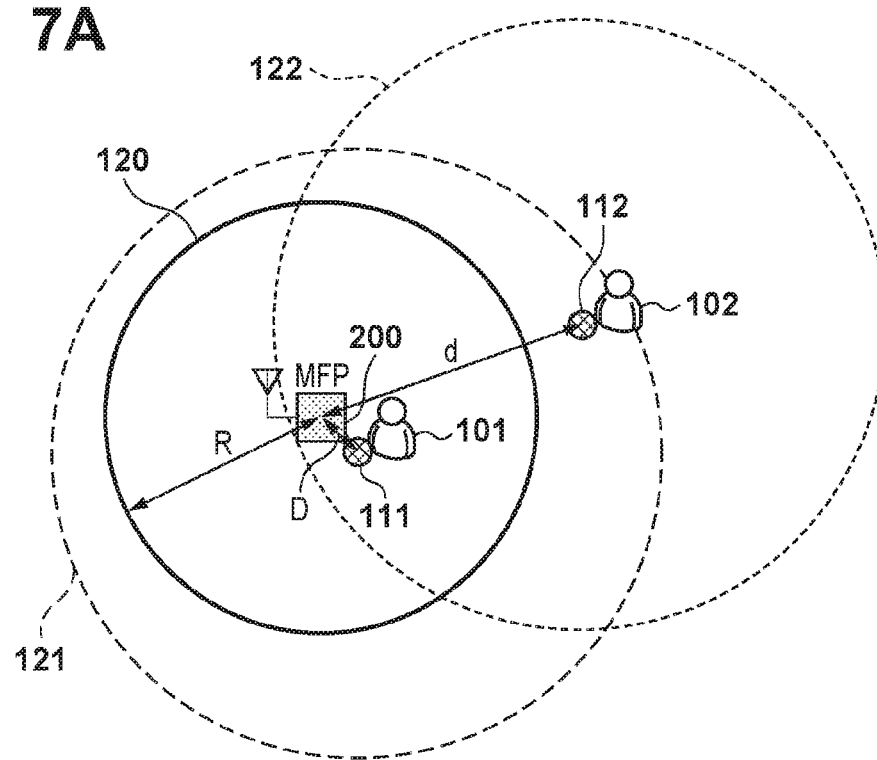
FIGS. 7A and 7B are views each showing the positional relationship between the MFP, a job executor, and another person.
Figure 7B:
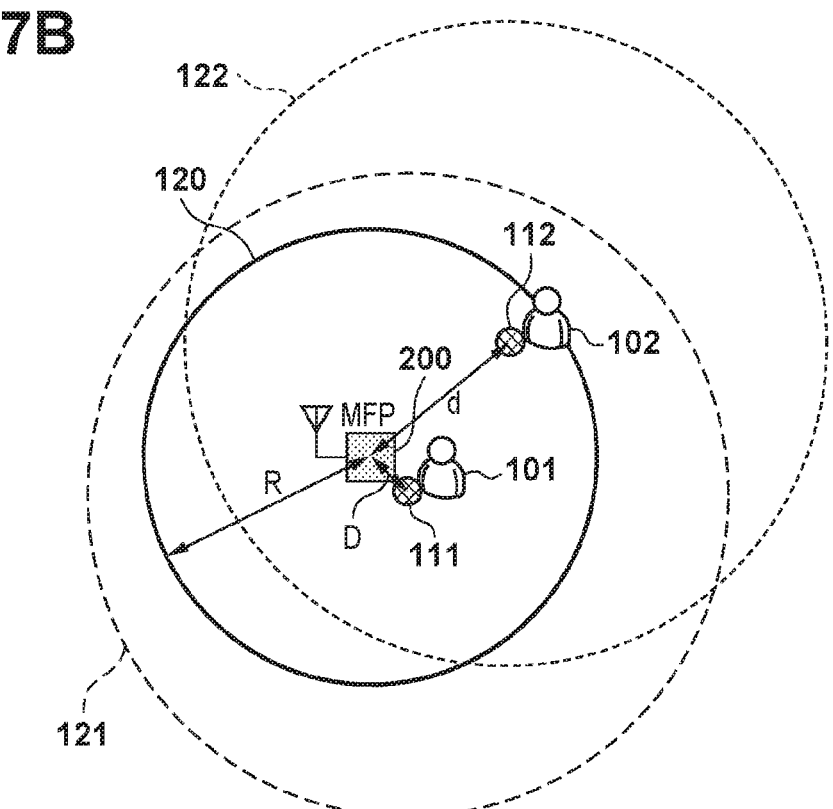

FIGS. 7A and 7B are views each showing the positional relationship between an MFP 200, a job executor 101, and another person 102. Note that in FIGS. 7A and 7B, the same reference numerals as those already described with reference to FIG. 1 denote the same components and a description thereof will be omitted. FIG. 7A shows the positional relationship when the other person 102 is outside a person detection area 120, and FIG. 7B shows the positional relationship when the other person 102 is in the person detection area 120. Note that this application assumes that a person other than the job executor 101 is considered as the other person 102. However, the present invention need not be limited to this. For example, a person who has heard, from the job executor, a personal identification number or the like necessary for authentication processing may perform authentication processing in the MFP 200. In this case, the executor of the authentication processing is the job executor 101 in FIGS. 7A and 7B, and a person different from the executor of the authentication processing is the other person 102 in FIGS. 7A and 7B. In this application, the job executor 101 can be called the executor of the authentication processing.

A case in which the other person 102 is outside the person detection area 120 will be described with reference to FIG. 7A. When the MFP 200 is activated, a BT unit 418 is set in an advertisement packet receivable state. A circle having a radius R is set as the boundary of the person detection area 120. The radius R may be settable by the user via an operation panel 205 or embedded in a program as a permanent value.

The job executor 101 carries a BLE wireless device 111, and currently executes an authenticated print job. The BLE wireless device 111 periodically transmits an advertisement packet, and its radio wave propagates to a radio coverage area 121 (a circle indicated by a broken line) of the BLE wireless device 111. The job executor 101 generally waits for completion of output near the MFP 200 to prevent an output material from leaking. Therefore, a distance D between the MFP 200 and the BLE wireless device 111 held by the job executor 101 is recognized as the shortest one of the distances between the MFP 200 and respective BLE wireless devices recognizable by the MFP 200.

On the other hand, the other person 102 exists near the MFP 200. The other person 102 carries a BLE wireless device 112, and the BLE wireless device 112 periodically transmits an advertisement packet. The radio wave of the packet propagates to a radio coverage area 122 of the BLE wireless device 112. If the MFP 200 falls within the range of the radio coverage area 122, it receives the advertisement packet from the BLE wireless device 112, and estimates a distance d between the MFP 200 and the BLE wireless device 112.

A case in which the other person 102 is in the person detection area 120 will now be described with reference to FIG. 7B.

The MFP 200 compares the distances d and R. If the distance d the distance R, the MFP 200 determines that there is the other person nearby; otherwise, the MFP 200 determines that there is no other person nearby. The example shown in FIG. 7B indicates a case in which the distance d the distance R holds. Note that there may be a plurality of other persons 102. In this case, the MFP 200 estimates distances with respect to all detectable radio waves.

FIG. 8 is a flowchart illustrating print control processing of an authentication print job executed by the MFP 200. Note that in this application, the respective steps of the flowchart of the MFP 200 are implemented when a CPU 402 reads out programs associated with the flowchart from a memory and executes them. As long as the object of this application is achieved, the order of the respective steps of the flowchart in this application may be changed or some processes may not be executed.

Upon receiving a print job, the MFP 200 determines in step S801 whether the received print job is a normal print job requiring no authentication or an authenticated print job requiring authentication. Note that the print job may be received from a host apparatus (not shown) via a WLAN unit 416 using a wireless communication interface or received from the host apparatus via a wired interface such as a LAN interface or USB interface (neither of which is shown).

If it is determined that the received print job is an authenticated print job, the process advances to step S802, and the MFP 200 performs authentication. This authentication processing is performed by a method of, for example, performing authentication by inputting a personal identification number using a 4-way selector 301 of the operation panel 205 or touching an NFC unit 206 with an IC card. That is, if the MFP 200 determines that the received print job is an authenticated print job requiring authentication processing, it holds the received authenticated print job in itself. After that, authentication processing is performed when an executor (or another user who has heard authentication information from the executor) who has instructed printing of the authenticated print job moves close to the MFP 200 to operate the operation panel or touches the MFP 200 with an IC card. On the other hand, if it is determined that the received print job is a normal job, the process advances to step S810 to execute printing based on received image data.

If it is determined in step S802 that authentication is OK, the process advances to step S803, and the MFP 200 checks whether there is another person nearby. To determine whether there is another person nearby, the distance d is estimated from a transmission power (Tx Power) 604 of the advertisement packet described with reference to FIG. 6 and the reception signal intensity of the packet. At this time, the job executor 101 which has performed authentication in step S802 exists near the MFP 200. Therefore, the MFP 200 checks whether the BLE wireless device 112 of the other person 102 except for the BLE wireless device 111 of the job executor 101 exists nearby.

If it is determined in step S803 that there is no other person 102 nearby, that is, if d>R holds with respect to all the BLE wireless devices 112 of the other persons 102, the process advances to step S804 to start authenticated printing. Furthermore, in step S805, processing while authenticated printing is executed is performed. Note that this processing will be described in detail later with reference to FIG. 9.

On the other hand, if it is determined in step S803 that there is the other person 102 nearby, that is, if d≤R holds with respect to at least one of the BLE wireless devices 112 of the other persons 102, the process advances to step S806. In step S806, the MFP 200 executes display control processing for displaying, on a display unit 306, a message indicating that there is another person nearby. In step S807, the MFP 200 confirms whether to execute or hold printing. More specifically, if the job executor 101 performs a selection operation by operating the 4-way selector 301, and presses a set key 302 to select execution of printing in step S807, the process advances to step S804 to start authenticated printing. On the other hand, if the job executor 101 performs a selection operation by operating the 4-way selector 301, and presses the set key 302 to select holding of printing in step S807, the process advances to step S808 to hold execution of the authenticated print job. In step S809, processing while authenticated printing is held is executed. Note that this processing will be described in detail later with reference to FIG. 10.

Figure 9:
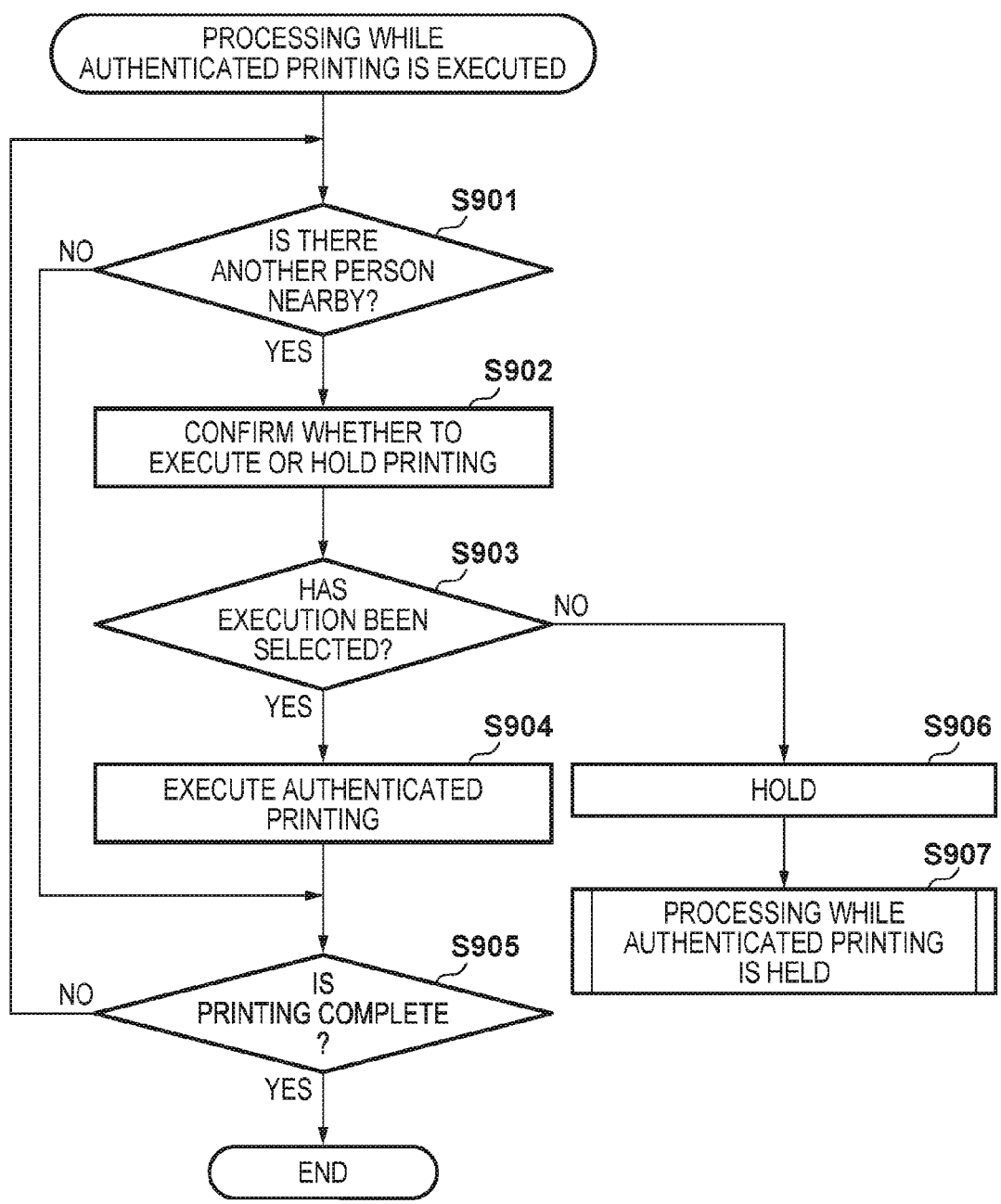
FIG. 9 is a flowchart illustrating details of processing while authenticated printing is executed in step S805.

FIG. 9 is a flowchart illustrating details of the processing while authenticated printing is executed in step S805.

In step S901, the MFP 200 monitors whether there is another person nearby. At this time, the MFP 200 waits for reception of the advertisement packet from the BLE wireless device 112. When the MFP 200 receives the advertisement packet from the BLE wireless device 112, it estimates the distance d, and checks whether the estimated distance d is equal to or shorter than the distance R.

If d>R (NO is determined in step S901), it is determined that there is no other person nearby, and the process advances from step S901 to step S905. Note that processing in step S905 will be described later. On the other hand, if d≤R, it is determined in step S901 that there is another person nearby, and the process advances to step S902. In step S902, the MFP 200 displays, on the display unit 306, a message indicating that there is another person nearby, and confirms with the job executor 101 whether to continuously execute or hold printing.

If the MFP 200 determines in step S903 that the job executor 101 has selected to continuously execute printing, the process advances to step S904 to continue authenticated printing. Furthermore, it is checked in step S905 whether authenticated printing is complete. If it is determined that authenticated printing is complete, the process ends; otherwise, the process returns to step S901 to continue the above-described processing.

On the other hand, if the MFP 200 determines in step S903 that the job executor 101 has selected to hold printing, the process advances to step S906 to hold execution of the authenticated print job. Then, printing of the next page does not start. In step S907, the MFP 200 executes the processing while authenticated printing is held. Note that this processing will be described in detail later with reference to FIG. 10. As described above, execution control of authenticated printing is performed.

Figure 10:
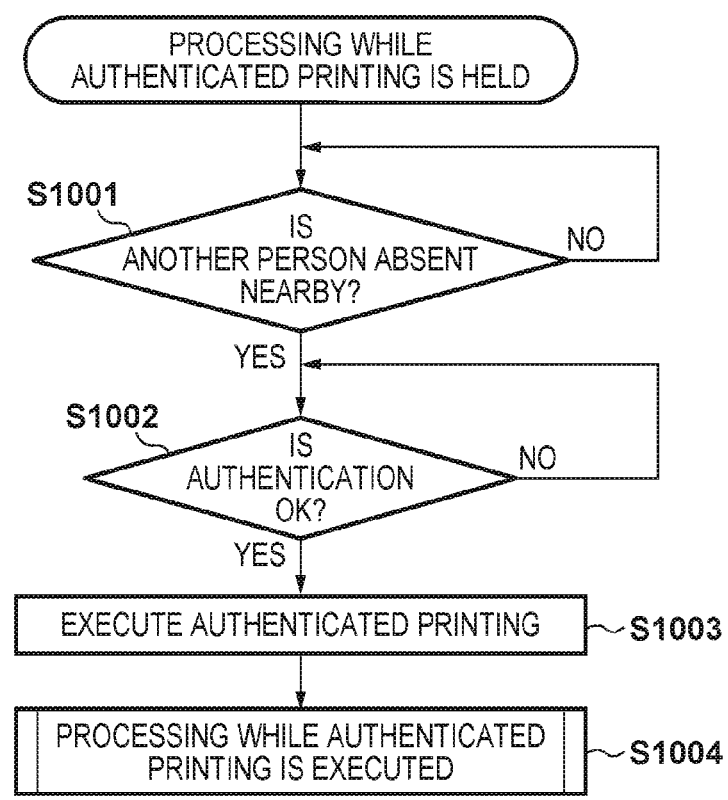
FIG. 10 is a flowchart illustrating details of processing while authenticated printing is held.

FIG. 10 is a flowchart showing details of the processing while authenticated printing is held in step S809 or S907.

In step S1001, the MFP 200 periodically monitors whether there is another person nearby. This monitoring processing is the same as in step S901 described above and a description thereof will be omitted.

If it is determined in step S1001 that there is another person nearby, the processing in step S1001 continues monitoring the nearby area. On the other hand, if it is determined that there is no other person nearby, the process advances to step S1002, and the MFP 200 displays, on the display unit 306, a message indicating that there is no other person nearby, and executes authentication processing. This authentication processing is the same as in step S802 described above and a description thereof will be omitted. If authentication is OK, the process advances to step S1003 to restart authenticated printing from a page next to that printed before holding. After that, in step S1004, the processing while authenticated printing is executed which has been described with reference to FIG. 9 is executed.

Figure 11:
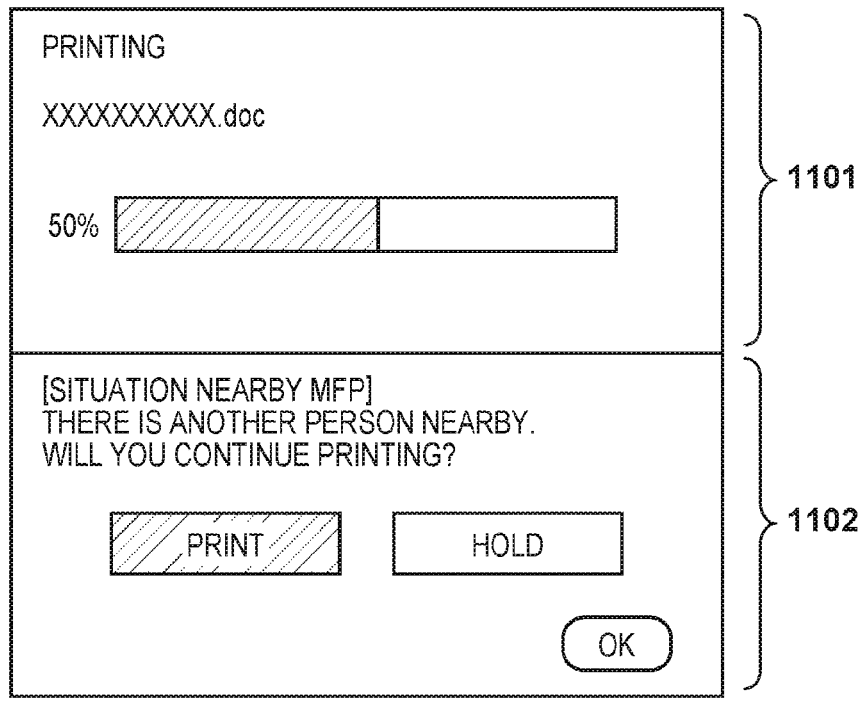
FIG. 11 is a view showing the screen of a display unit on which a message is displayed by executing step S806 or S902.

FIG. 11 is a view showing an example of a screen which is displayed on the display unit 306 by executing step S806 or S902.

In the display screen shown in FIG. 11, the processing state of the authenticated print job, a print job name, and the degree of progress by a progress bar are displayed in an upper portion 1101, and a screen for selecting whether to execute or hold printing is displayed in a lower portion 1102. The job executor 101 selects to continue or hold authenticated printing by operating the 4-way selector 301 in response to display of the message, and finalizes the selection by pressing the set key 302.

According to the above-described embodiment, therefore, it is possible to select execution/holding of authenticated printing every time the existence of another person nearby the MFP is detected in authenticated printing.

Note that in the above-described embodiment, execution/holding of authenticated printing is selected every time there is another person nearby. However, if execution of printing is selected, it is recognized that the job executor has determined that there is no problem even if there is another person nearby, and processing of monitoring the nearby area may not be performed thereafter. That is, the processing while authenticated printing is executed may be released and processing is performed as a normal job.

Second Embodiment

In the first embodiment, at the time of authenticated printing, the distance between the MFP and the BLE wireless device is estimated based on information set in the advertisement packet of BLE and its reception intensity, and it is determined whether there is another person nearby. In this embodiment, an example in which it is possible to further improve the confidentiality and prevent information from leaking will be described.

Figure 12:
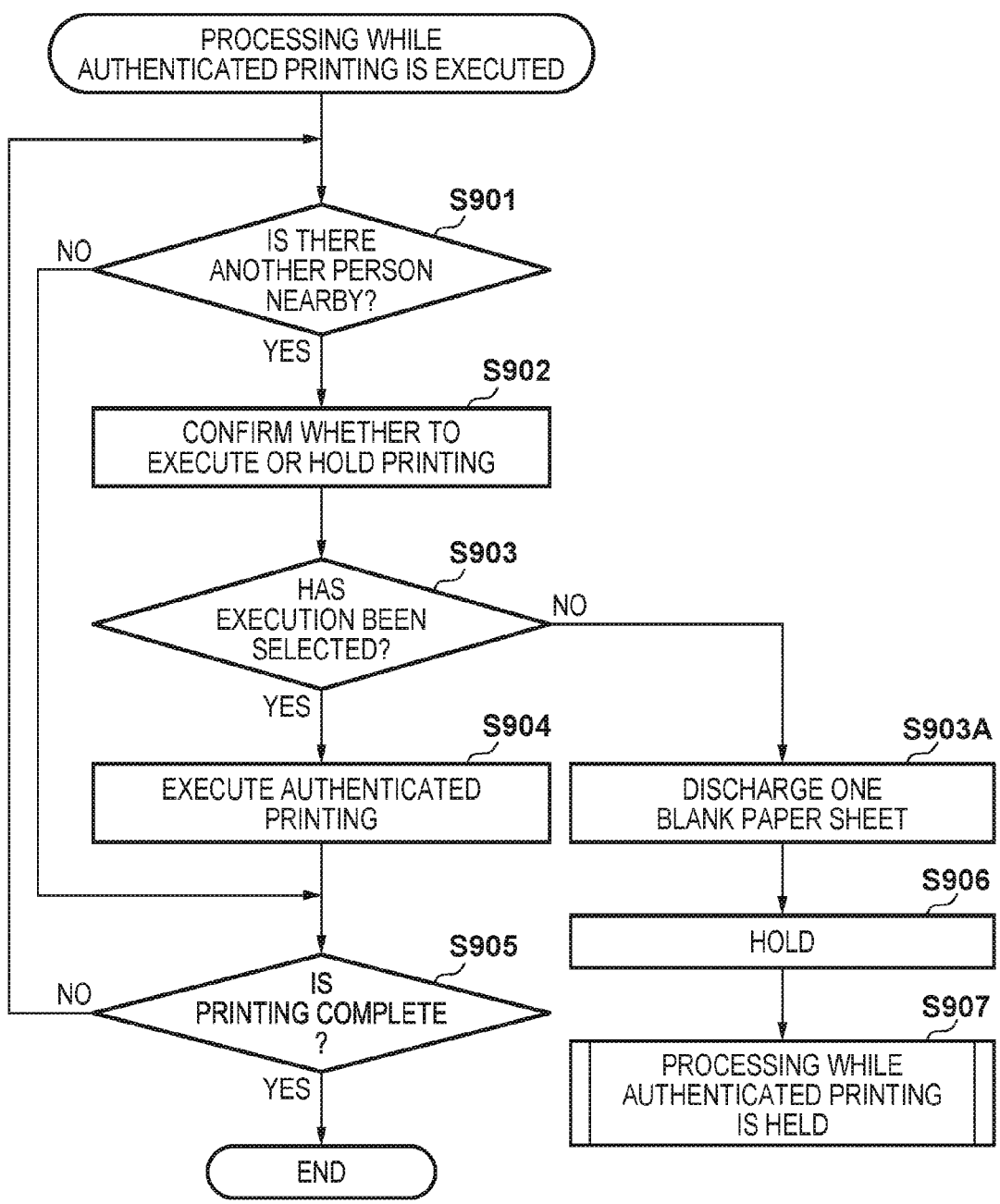
FIG. 12 is a flowchart illustrating details of processing while authenticated printing is executed according to the second embodiment.

FIG. 12 is a flowchart illustrating details of processing while authenticated printing is executed in step S805 according to the second embodiment. Note that in FIG. 12, the same step reference symbols as those already described with reference to FIG. 9 denote the same processing steps and a description thereof will be omitted.

Referring to FIG. 12, if an MFP 200 determines in step S903 that a job executor 101 has selected to hold printing, the process advances to step S903A, and the MFP 200 discharges one blank paper sheet. When this selection is made, print media of pages printed so far have been output onto a discharge tray (not shown). If another person 102 moves close to the MFP 200 in this state, he/she may accidentally glance at contents of a printed material discharged on top. To solve this problem, in step S903A, the MFP 200 discharges one blank paper sheet. After that, the process advances to step S906.

According to the above-described embodiment, therefore, when another person exists near the MFP at the time of authenticated printing, if holding of printing is selected, a blank print medium is discharged onto an already output printed material, thereby preventing a third party from glancing at contents of the output printed material. This allows authenticated printing with high confidentiality.

Third Embodiment

In the first embodiment, at the time of authenticated printing, the distance between the MFP and the BLE wireless device is estimated based on information set in the advertisement packet of BLE and its reception intensity, and it is determined whether there is another person nearby. In this embodiment, an example in which a situation nearby an MFP is displayed on a display unit 306 to further improve the user convenience will be described.

Figure 13:
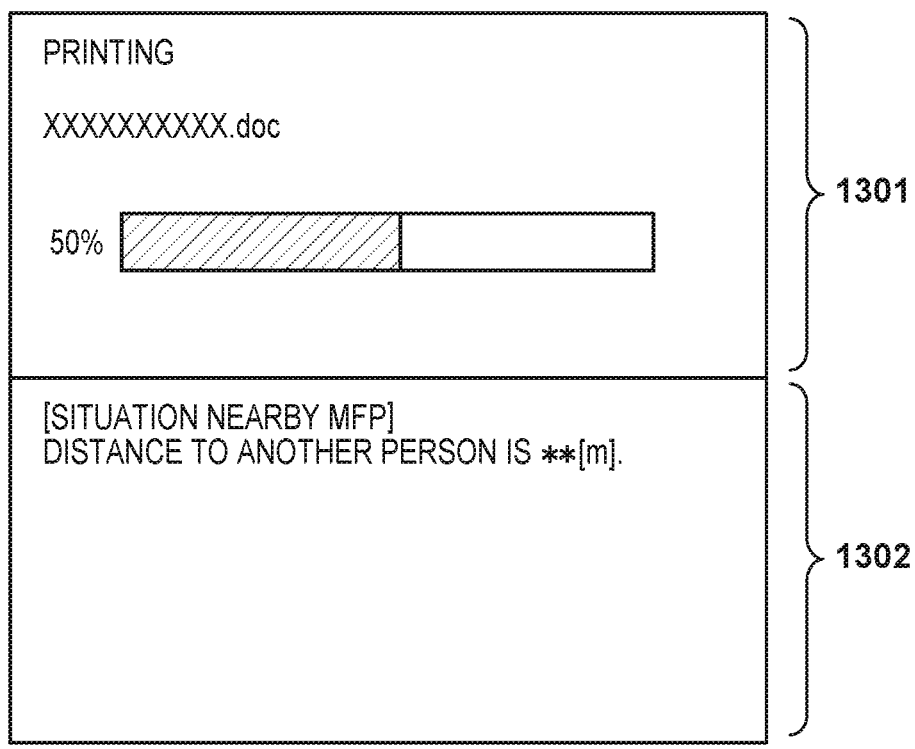
FIG. 13 is a view showing the display screen of a display unit while authenticated printing is executed according to the third embodiment.

FIG. 13 is a view showing the display screen of the display unit 306 while authenticated printing is executed according to the third embodiment.

In the display screen shown in FIG. 13, the same information as that in a display screen (upper portion) 1101 shown in FIG. 11 is displayed in an upper portion 1301, and a situation nearby an MFP is displayed in a lower portion 1302. A distance displayed in this screen is a distance d between an MFP and the BLE wireless device of another person 102. Note that the display screen (lower portion) 1302 may display only the distance d from an MFP 200 to the closest other person 102, or display the distances d to all detectable other persons 102. The distance display is updated every time an advertisement packet is received from a BLE wireless device 112.

Fourth Embodiment

An example in which printing is quickly completed even if execution of printing is selected even though another person nearby an MFP exists at the time of authenticated printing will now be described.

According to the above-described embodiments, execution of printing is selected in step S807 of FIG. 8, step S903 of FIG. 9, or step S903 of FIG. 12, the process advances to step S804 of FIG. 8, step S904 of FIG. 9, or step S904 of FIG. 12 to execute authenticated printing. In this embodiment, at this time, printing is executed by switching the print speed to a high-speed mode.

According to the above-described embodiment, therefore, it is possible to shorten the time to complete authenticated printing at the time of authenticated printing, thereby increasing the probability that printing is completed before another person moves close to the MFP.

Note that in the above-described embodiment, BLE is used as short distance wireless communication. The present invention, however, is not limited to this. For example, another wireless communication method capable of performing broadcast transmission, such as ZigBee, is applicable.

In the above-described embodiment, each person has a BLE wireless device, and the MFP receives a radio wave from the device, measures the distance to each device, and determines whether there is another person near the MFP. The present invention, however, is not limited to this. For example, an MFP may include a BLE wireless device, and the mobile terminal such as a smartphone of each person may receive a radio wave from the BLE wireless device, and notify an MFP 200 of the radio wave via a server, thereby detecting the position of each person. Alternatively, a plurality of BLE wireless devices may be arranged in a room where an MFP is installed, and the position of a person may be detected by triangulation. An MFP may include a millimeter-wave transceiver, scan the antenna of the transceiver, search an area nearby the MFP, and receive the reflected wave of a millimeter wave, thereby detecting the existence of a person.

Furthermore, in the above-described embodiment, a person closest to the MFP is regarded as the job executor of authenticated printing and persons except for the job executor are regarded as other persons. However, user determination may be performed based on information in the advertisement packet to identify a job executor and other persons.

In addition, in the above embodiment, the distance d from the MFP to the BLE wireless device is displayed on the display unit of the MFP. However, the present invention is not limited to this. For example, information of the distance d from the MFP to the mobile terminal such as a smartphone of the job executor of authenticated printing may be transmitted using WLAN communication, and displayed on the mobile terminal. This application assumes that the MFP 200 executes the processes of FIGS. 8 to 10 and 12. However, an external apparatus (for example, a PC, a print server, or the like) capable of controlling the MFP 200 may control the MFP 200 by executing the processes of FIGS. 8 to 10 and 12.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-024695, filed Feb. 10, 2015, which is hereby incorporated by reference herein in its entirety.

What is claimed is:

1. A print control apparatus for controlling a print unit configured to print an image on a print medium based on a print job, comprising:
   a reception unit configured to receive the print job;
   a determination unit configured to, in a case where the print job received by the reception unit is an authenticated print job requiring authentication processing, determine whether there is a plurality of persons near the print control apparatus;
   a hold unit configured to, in a case where it is determined by the determination unit that there is a plurality of persons near the print control apparatus, hold print processing based on the authenticated print job; and a control unit configured to, in a case where a state in which there is a plurality of persons near the print control apparatus has changed to a state in which there is a single person near the print control apparatus, restart the print processing held by the hold unit, wherein a print product produced by printing the image on the print medium by restarting the held print processing is discharged onto a discharge unit of the print control apparatus, and the determination unit, the hold unit, and the control unit are implemented by a processor.

2. The apparatus according to claim 1, further comprising an authentication unit configured to authenticate upon executing the authenticated print job, wherein the authentication unit is implemented by the processor.

3. The apparatus according to claim 1, further comprising a display control unit configured to, in a case where the print job received by the reception unit is an authenticated print job requiring authentication processing and there is a plurality of persons near the print unit, display a selection screen which prompts to select either print execution or print hold, wherein in a case where the print hold is selected in the selection screen, the hold unit holds the print processing based on the authenticated print job, and the display control unit is implemented by the processor.

4. The apparatus according to claim 3, wherein in a case where the print execution is selected in the selection screen, the control unit monitors whether the plurality of persons is near the print control apparatus during execution of authenticated printing, and in a case where it is detected that the plurality of persons is near the print control apparatus during the execution of the authenticated printing, the display control unit displays the selection screen.

5. The apparatus according to claim 3, wherein in the case where the print hold is selected, the control unit controls to discharge a white blank sheet in addition to an already printed and discharged print medium.

6. The apparatus according to claim 3, wherein the display control unit further displays a message indicating a situation near the print control apparatus.

7. The apparatus according to claim 6, wherein the display control unit further displays a distance between the print control apparatus and a wireless communication device of another person.

8. The apparatus according to claim 1, further comprising:

a communication unit configured to perform short distance wireless communication;

an estimation unit configured to estimate a distance between the print unit and a wireless communication device by performing short distance wireless communication with the wireless communication device nearby near the print unit by the communication unit; and a comparison unit configured to compare the distance estimated by the estimation unit with a predetermined distance, wherein, based on a result of comparison by the comparison unit, the determination unit determines whether there is a plurality of persons near the print control apparatus, and the estimation unit and the comparison unit are implemented by the processor.

9. The apparatus according to claim 8, wherein the communication unit performs short distance wireless communication using Bluetooth® and receives an advertisement packet from the wireless communication device, and the estimation unit estimates the distance, based on a reception intensity of the received advertisement packet and a transmission power set in the advertisement packet.

10. A print control method in a print control apparatus for controlling a print unit configured to print an image on a print medium based on a print job, comprising:

receiving the print job;

in a case where the received print job is an authenticated print job requiring authentication processing, determining whether there is a plurality of persons near the print control apparatus;

in a case where there is a plurality of persons near the print control apparatus, holding print processing based on the authenticated print job; and in a case where a state in which there is a plurality of persons near the print control apparatus has changed to a state in which there is a single person near the print control apparatus, restarting the held print processing, wherein a print product produced by printing the image on the print medium by restarting the held print processing is discharged onto a discharge unit of the print control apparatus.

11. The method according to claim 10, further comprising authenticating upon executing the authenticated print job.

12. The method according to claim 10, further comprising:

in a case where the received print job is an authenticated print job requiring authentication processing and there is a plurality of persons near the print unit, displaying a selection screen which prompts to select either print execution or print hold; and in a case where the print hold is selected in the selection screen, holding the print processing based on the authenticated print job.

13. The method according to claim 12, wherein in a case where the print execution is selected in the selection screen, whether the plurality of persons is near the print control apparatus is monitored during execution of authenticated printing, and in a case where it is detected that the plurality of persons is near the print control apparatus during the execution of the authenticated printing, the selection screen is displayed.

14. The method according to claim 12, further comprising, in the case where the print hold is selected, discharging a white blank sheet in addition to an already printed and discharged print medium.

15. The method according to claim 12, wherein in the displaying, a message indicating a situation near the print control apparatus is further displayed.

16. The method according to claim 15, wherein in the displaying, a distance between the print control apparatus and a wireless communication device of another person is further displayed.

17. The method according to claim 12, further comprising, in a case where the plurality of persons is detected and the print execution is selected, controlling the print unit to perform high speed printing after the selection.

18. The method according to claim 10, further comprising:

performing short distance wireless communication;

estimating a distance between the print unit and a wireless communication device by performing short distance wireless communication with the wireless communication device near the print control apparatus; and comparing the estimated distance with a predetermined distance, wherein in the determining, based on a result of the comparison, it is determined whether there is a plurality of persons near the print control apparatus.

19. The method according to claim 18, wherein in the estimating, the short distance wireless communication is performed using Bluetooth® and an advertisement packet is received from the wireless communication device, and the distance is estimated, based on a reception intensity of the received advertisement packet and a transmission power set in the advertisement packet.

20. A non-transitory computer readable storage medium which stores a computer program to be executed in a processor of a print control apparatus for controlling a print unit configured to print an image on a print medium based on a print job, the program causing the print control apparatus to perform:

receiving the print job;

in a case where the received print job is an authenticated print job requiring authentication processing, determining whether there is a plurality of persons near the print control apparatus;

in a case where there is a plurality of persons near the print control apparatus, holding print processing based on the authenticated print job; and in a case where a state in which there is a plurality of persons near the print control apparatus has changed to a state in which there is a single person near the print control apparatus, restarting the held print processing, wherein a print product produced by printing the image on the print medium by restarting the held print processing is discharged onto a discharge unit of the print control apparatus.

* * * * *